United States Patent
Farag et al.

(10) Patent No.: US 7,646,801 B2
(45) Date of Patent: Jan. 12, 2010

(54) METHOD AND APPARATUS FOR SPREADING AND MODULATING COMMUNICATION SIGNALS

(75) Inventors: Emad N. Farag, Flanders, NJ (US); Yousef M. Hawwar, Fairfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 597 days.

(21) Appl. No.: 11/339,570

(22) Filed: Jan. 26, 2006

(65) Prior Publication Data

US 2007/0171961 A1    Jul. 26, 2007

(51) Int. Cl.
*H04B 1/00* (2006.01)

(52) U.S. Cl. .................. 375/146; 375/261; 375/295; 375/298

(58) Field of Classification Search .............. 375/146, 375/261, 295, 298
See application file for complete search history.

(56) References Cited

U.S. PATENT DOCUMENTS

| | | | |
|---|---|---|---|
| 6,532,250 B1 * | 3/2003 | Palenius et al. | 375/141 |
| 6,717,462 B2 * | 4/2004 | Loheit et al. | 329/304 |
| 7,078,981 B2 * | 7/2006 | Farag | 332/103 |
| 2006/0022765 A1 | 2/2006 | Farag | |

OTHER PUBLICATIONS

"3$^{rd}$ Generation Parnership Project; Technial Specification Group Radio Access Network; Spreading And Modulation (FDD)", 3GPP TS 25.213 v6.3.0 (Jun. 2005).

* cited by examiner

*Primary Examiner*—Ted M Wang
(74) *Attorney, Agent, or Firm*—Harness, Dickey & Pierce

(57) ABSTRACT

According to one embodiment, a lower order modulator is provided using a number of higher order modulators. According to another embodiment, a signal having a lower order spreading factor is generated using circuitry for generating a number of signals with a higher order spreading factor.

12 Claims, 6 Drawing Sheets

Prior Art

FIG. 3

Prior Art

METHOD AND APPARATUS FOR SPREADING AND MODULATING COMMUNICATION SIGNALS

BACKGROUND OF THE INVENTION

1. Field of the Invention

The present invention relates to communication, and more particularly, a method and apparatus for modulating and spreading communication signals.

2. Description of Related Art

Digital communication relies on numerous different, albeit related, forms of digital modulation such as phase shift keying (PSK), bi-phase shift keying (BPSK), quadrature phase shift keying (QPSK or 4-PSK), and quadrature amplitude modulation (QAM).

Figure 1:
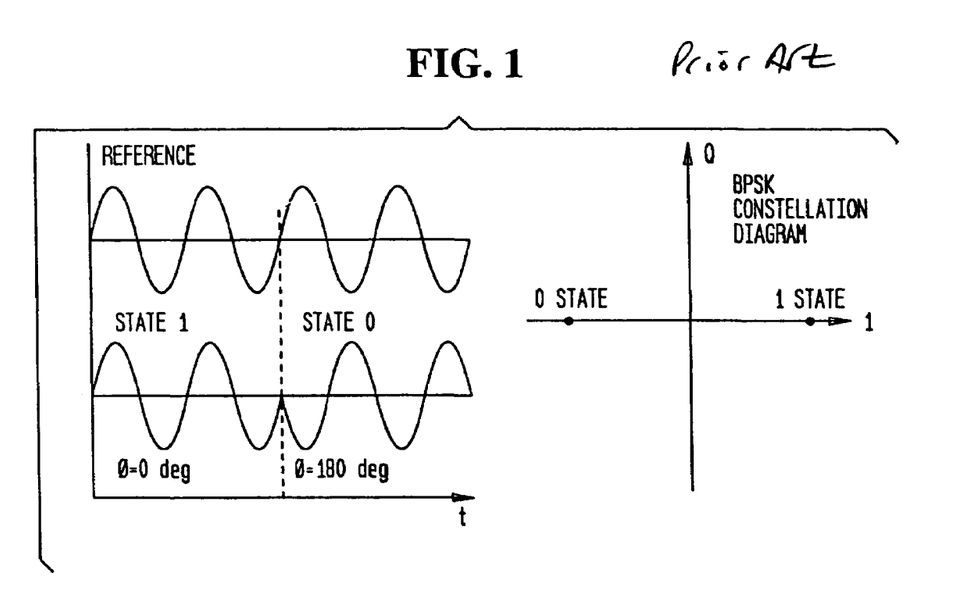
FIG. 1 illustrates the reference carrier, keyed reference carrier and constellation diagram for bi-phase shift keying.

BPSK will be described with reference to FIG. 1. As shown, the magnitude of a reference carrier is constant, and to transmit either a 0 or a 1, the phase thereof is "keyed" or switched between 0° and 180°. A receiver then decides whether a 0 or a 1 was transmitted based on the phase of the received carrier, and generates the original data stream. With this simple scheme, one bit of information is transmitted with each state or symbol, so that the carrier phase is keyed at the data rate. FIG. 1 also illustrates the constellation for BPSK. As shown, the BPSK constellation diagram includes two points in the I-Q plane where I stands for in-phase (i.e., phase reference) and Q stands for quadrature (i.e., 90° out-of-phase). The two points in the BPSK constellation diagram represent the position of the signal at the "timing instance". The timing instance is when the receiver interprets the signal. The signal can only be at one position at a time, but the constellation can be thought of as having persistence so that all of the proper states appear. Constellation diagrams such as in FIG. 1 typically do not show the transition between states and it should be noted that this transition does take a finite time. But for clarity, the transitions are not shown otherwise traces connecting the two states would clutter the diagram. Furthermore, instead of being located on the I-axis, the constellation points could, for example, lie on the Q-axis.

Figure 2:
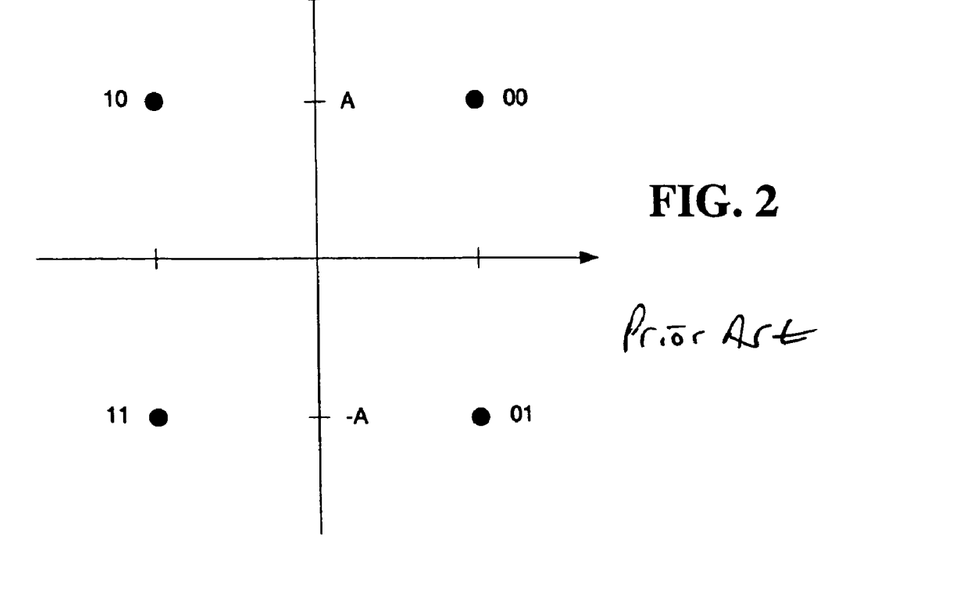
FIG. 2 illustrates the constellation diagram for quadrature phase shift keying.

FIG. 2 illustrates the constellation diagram for QPSK. As shown, four different states exist in the QPSK diagram at, for example, phase values of 45°, 135°, 225°, and 315°. As further shown, each state corresponds to a symbol representing two bits. Because the data is taken two bits at a time to form a symbol, the symbol rate is half the bit rate. As a result, QPSK requires half the band width of BPSK for the same bit rate.

Figure 3:
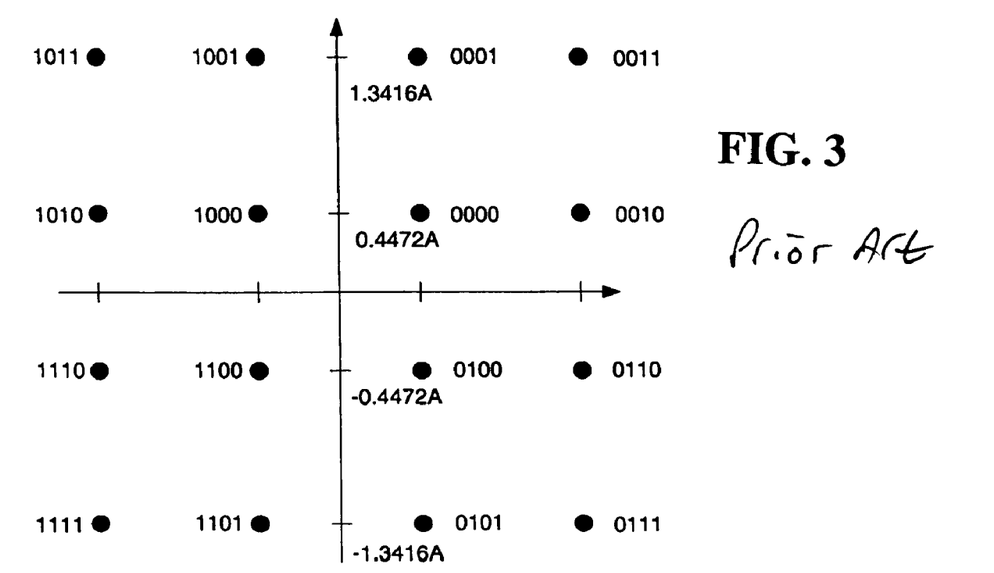
FIG. 3 illustrates the constellation diagram for 16-quadrature amplitude modulation.

FIG. 3 illustrates the constellation for 16-QAM (quadrature amplitude modulation). In addition to modulating the phase, the amplitude of the signal is also modulated to create four distinct constellation points within each quadrant of the I-Q plane. As shown, in 16-QAM, one symbol represents four bits of data.

Figure 4:
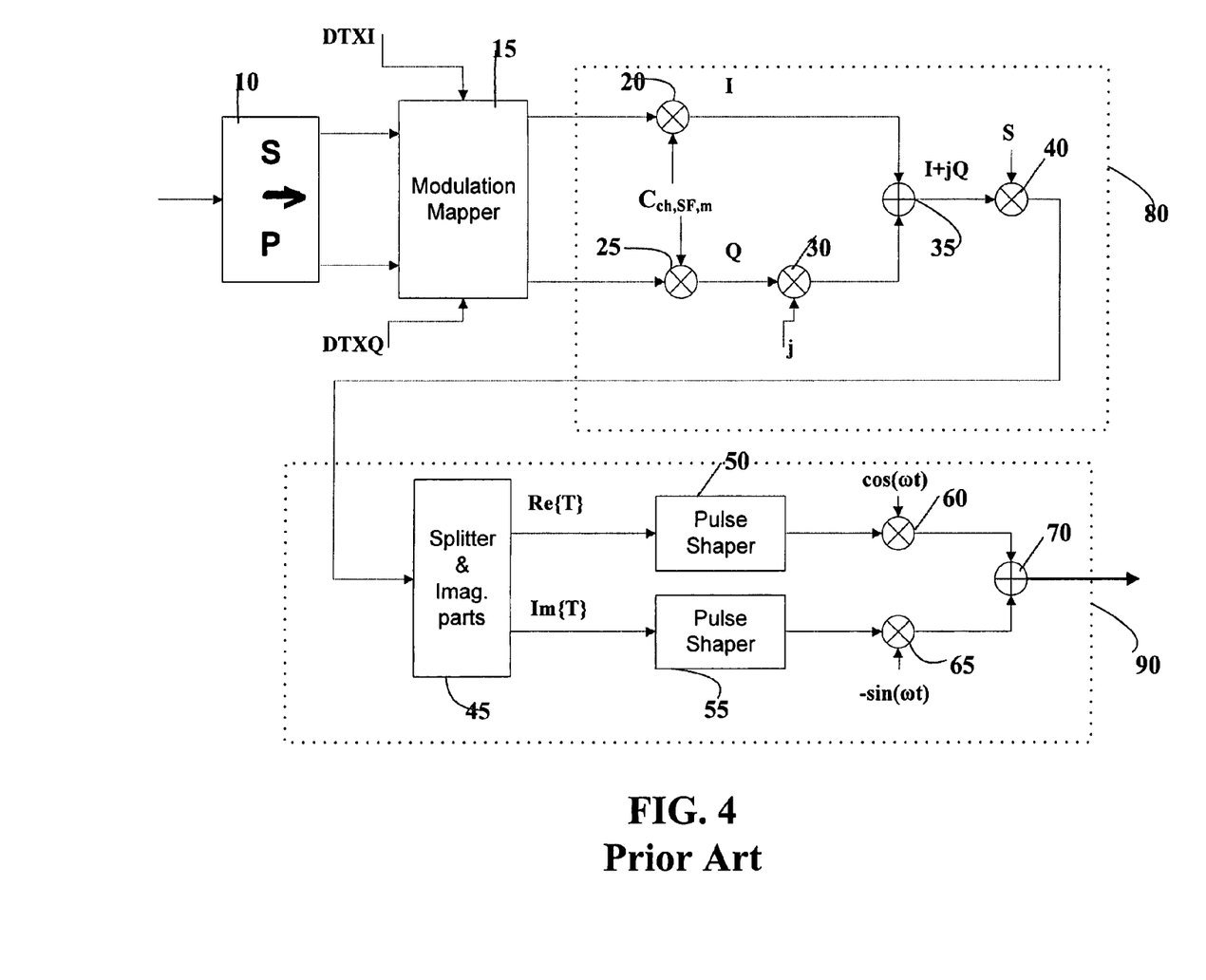
FIG. 4 illustrates a prior art architecture for spreading and modulating data for transmission.

FIG. 4 illustrates a prior art architecture for spreading and modulating data for transmission. As shown, a serial-to-parallel converter 10 converts the serial data to parallel. A modulation mapper 15 then maps the parallel data to respective symbols in the I-Q plane. For example, the modulation mapper 15 may map one type of channel according to QPSK and a different type of channel according to 16 QAM. For the example of QPSK, the serial-to parallel converter 1-10 converts serial data into respective pairs of parallel data. The modulation mapper 15, may map the binary value of "0" to the real value of +1, and the binary value of "1" to the real value of −1.

However, the modulation mapper 15 also receives I and Q DTX control signals DTXI and DTXQ. As is known, DTX stands for discontinued transmission (i.e., no transmission). Accordingly, if the I DTX control signal DTXI is asserted (e.g., DTXI is 0), the modulation mapper 15 outputs the real value of 0 as the I signal. Likewise, if the Q DTX control signal DTXQ is asserted (DTXQ is 0), the modulation mapper 15 outputs the real value of 0 as the Q signal. If the I DTX control signal DTXI and/or the Q DTX control signal DTXQ are not asserted (e.g., DTXI and/or DTIXQ is 1), then the modulation mapper 15 outputs the I and/or Q signals based on the received parallel data. As is known, instead of having separate DTX control signals for the I signal and the Q signal, a single DTX control signal may be used.

Next, the I and Q signals output from the modulation mapper 15 undergo spreading by a spreading unit 80. The spreading unit 80 includes a channelization operation and a scrambling operation. In the channelization operation, the I and Q data are multiplied with a channelization code $C_{ch,SF,m}$ by respective multipliers 20 and 25. Here, ch indicates the code C is a channelization code, SF is the spreading factor (described below) and m is the code number (also described below). The channelization operation transforms each data symbol into a number of chips, thus increasing the bandwidth of the signal. The number of chips per data symbol is called the spreading factor (SF).

Figure 5:
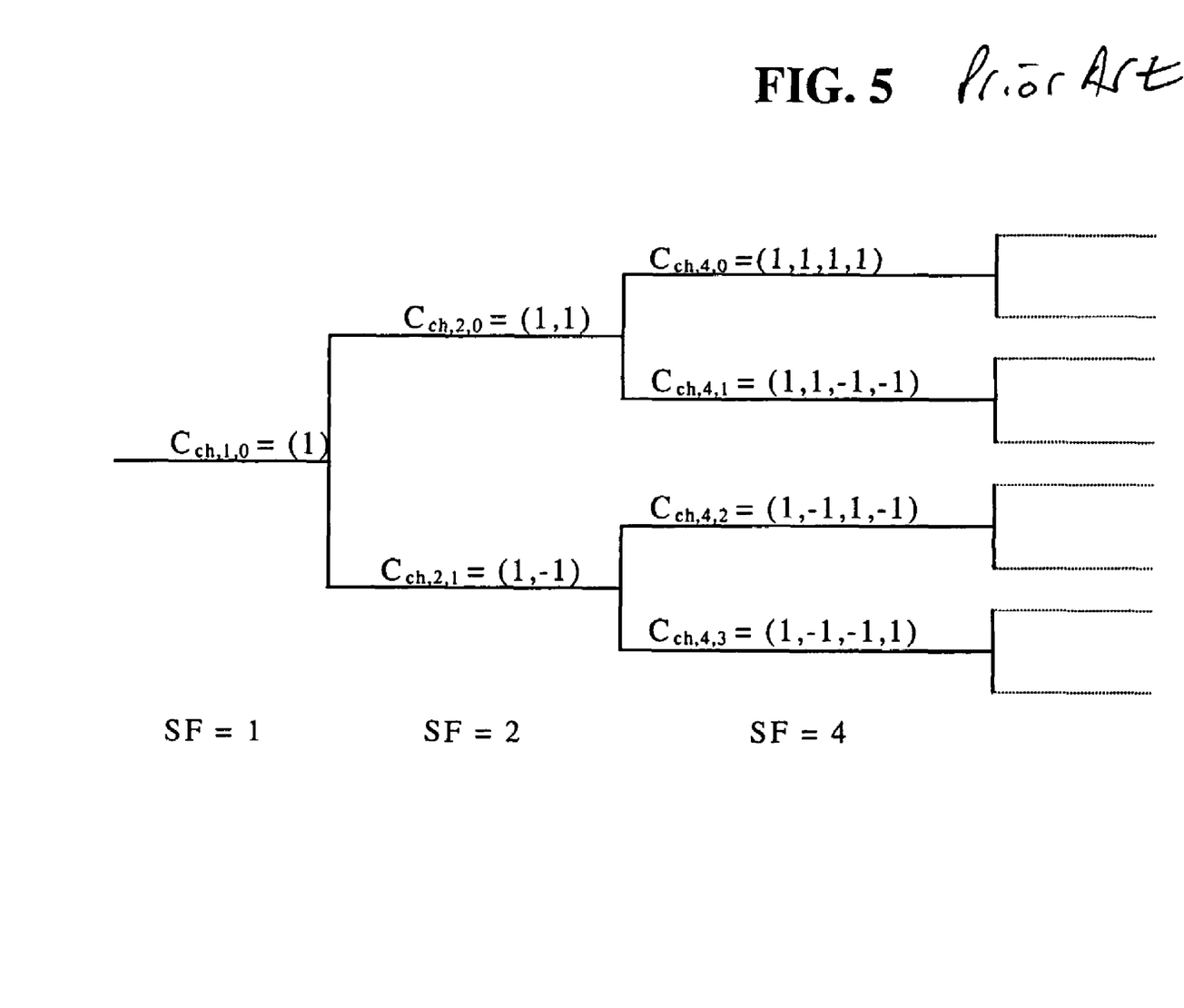
FIG. 5 illustrates a code tree defining Orthogonal Variable Spreading Factor (OVSF) codes.

Channelization codes may be Orthogonal Variable Spreading Factor (OVSF) codes that preserve orthogonality between different signals. The OVSF codes may be defined using the code tree of FIG. 5. As shown, the channelization codes are uniquely described as $C_{ch,SF,m}$, where SF is the spreading factor of the code and m is the code number $0<=m<=SF-1$. Namely, each code tree defines channelization codes of length SF, corresponding to a spreading factor of SF as shown in FIG. 5, and each channelization code of spreading factor SF may have SF code patterns uniquely identified by the code number m.

After channelization, the Q signal is shifted 90 degrees from the I signal by the multiplier 30, and a summer 35 sums the I and Q signals. As a result, the summation signal includes a total of eight chips for the pair of parallel input bits—four chips on the I signal portion and four chips on the Q signal portion. A multiplier 40 scrambles the summation signal output by the summer 35 by multiplying the summation signal with a scrambling code S. Namely, the sequence of complex valued chips are scrambled (complex chip-wise multiplication) by a complex-valued scrambling code S.

The scrambled summation signal is then modulated by a modulation unit 90. The modulation unit 90 includes a splitter 45 that splits the scrambled summation signal into real and imaginary parts. Respective pulse shapers 50 and 55 pulse shape the real and imaginary signals, respectively. Modulation is completed by mixing the real signal with a cos (wt) signal at multiplier 60 and the imaginary signal with a −sin (wt) signal at multiplier 65. A summer 70 sums the modulated signals to produce a signal for transmission.

Conventionally, the channelization, scrambling and modulation operations in the architecture of FIG. 4 are implemented in an application specific integrated circuit (ASIC). However, most third generation wireless communication standards create significant challenges in designing and developing architectures for baseband processing as described above with respect to FIG. 4. Add to this the fact that most of these standards are evolutionary, and it will be appreciated that creating such architectures is like hitting a moving target.

SUMMARY OF THE INVENTION

The development of a modulator generally involves the preparation of an application specific integrated circuit (ASIC). This development may be costly and time consuming. The present invention may mitigate these drawbacks by providing a lower order modulator that may leverage existing higher order modulator circuitry. For example, application specific integrated circuits (ASICs) providing a number (e.g., eight) QPSK modulators on each chip are available and in use in the telecommunication industry.

In one embodiment, two QPSK modulators are used to generate a BPSK signal. In this embodiment, a digital signal processor receives the bits for modulation, and generates the input to the two QPSK modulators such that combining the output from the two QPSK modulators results in a BPSK signal.

The present invention may also mitigate the above mentioned drawbacks by generating a signal with a lower order spreading factor by leverage existing circuitry generating signals of a higher order spreading factor. For example, application specific integrated circuits (ASICs) providing signals with a spreading factor of four are available and in use in the telecommunication industry.

In one embodiment, such an ASIC is used to generate two signals of spreading factor (SF) four, each signal having a different pattern. In this embodiment, a digital signal processor receives the bits for spreading, and generates the input to the ASIC such that combining the signals of SF4 results in a signal of SF2.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

The present invention is directed, according to one embodiment, to providing a lower order modulator using a number of higher order modulators. For the purposes of example only, the derivation of a BPSK modulator using two QPSK modulators will be described. However, it will be appreciated that the present invention is not limited to this example. Furthermore, the present invention is directed, according to one embodiment, to providing a signal with a lower order spreading factor using a number of signals with a higher order spreading factor. For the purposes of example only, the derivation of signal with a spreading factor of 2 using two signals with a spreading factor of 4 will be described. However, it will be appreciated that the present invention is not limited to this example.

Figure 6:
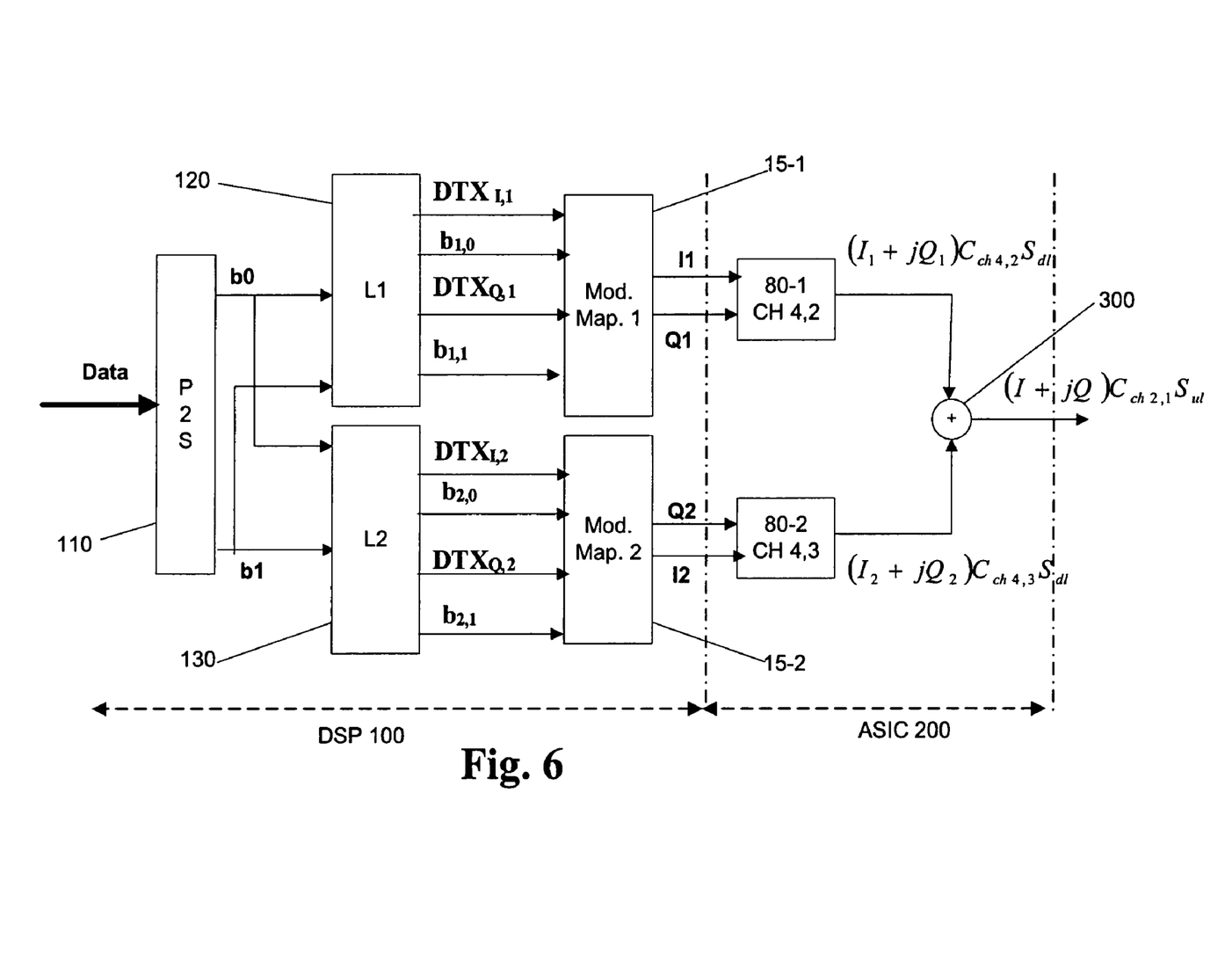
FIG. 6 illustrates a portion of an architecture for spreading data for transmission according to an embodiment of the present invention.

FIG. 6 illustrates a portion of an architecture for spreading data for transmission according to an embodiment of the present invention. More specifically, FIG. 6 illustrates the architecture for deriving a BPSK signal with SF2 and code number 1 (i.e., the (1, −1) pattern) from two QPSK signals with SF 4 and code numbers 2 and 3 (i.e., code patterns (1, −1,1, −1) and (1, −1, −1, 1)), respectively. As shown, a digital signal processor 100 generates first I and Q signals I1 and Q1 for input to a first spreading unit 80-1, having the same architecture as the spreading unit 80 discussed above with respect to FIG. 4, from sequential digital data. The digital signal processor 100 also generates second I and Q signals I2 and Q2 for input to a second spreading unit 80-2, having the same architecture as the spreading unit 80 discussed above with respect to FIG. 4, from the sequential digital data.

As shown in FIG. 6, the sequential digital data is received by a serial-to-parallel converter 110 in the digital signal processor 100 and grouped into two parallel data bits b0 and b1. The two bits of parallel data are supplied to a first logic unit 120 and a second logic unit 130. The first logic unit 120 generates a first input bit b1,0, a second input bit b1,1, a first I DTX control signal DTXI1 and a first Q DTX control signal DTXQ1, and supplies these signals to a first modulation mapper 15-1. The second logic unit 130 generates a third input bit b2,0, a fourth input bit b2,1, a second I DTX control signal DTXI2 and a second Q DTX control signal DTXQ2, and supplies these signals to a second modulation mapper 15-2. The first and second modulation mappers 15-1 and 15-2 operate in the same manner as discussed above with respect to the modulation mapper 15 in FIG. 4. Accordingly, the first modulation mapper 15-1 generates the first I and Q signals I1 and Q1, and the second modulation mapper 15-2 generates the second I and Q signals I2 and Q2.

As mentioned previously, the BPSK constellation points may lie on the I-axis, or as another example, may lie on the Q-axis. Depending on the axis chosen, I or Q, the first and second logic units 120 and 130 perform different logical operations to generate the signals supplied to the first and second modulation mappers 15-1 and 15-2.

Next, the operation of the first logic unit 120 will be explained in detail for generating Q-axis BPSK constellation points. In this embodiment, the first logic unit 120 outputs a real value of 0 as the first input bit b1,0 regardless of the value of the parallel bits b0 and b1, and performs an AND operation on the first and second parallel bits b0 and b1 to generate the first Q signal Q1. Also, the first logic unit 120 outputs an asserted first I DTX control signal DTXI1 (e.g., DTXI1 is 0) regardless of the value of the parallel bits b0 and b1. The first logic unit 120 exclusive ORs the first and second parallel bits b0 and b1 and takes the inverse of the exclusive OR result to generate the first Q DTX control signal DTXQ1. Table 1 below illustrates the signals generated by the first logic unit 120 for the different possible combination of the parallel bits b0 and b1.

TABLE 1

| $b_0 b_1$ | $b_{1,0}$ | $b_{1,1}$ | DTXI1 | DTXQ1 |
|---|---|---|---|---|
| 00 | 0 | 0 | 0 | 1 |
| 01 | 0 | 0 | 0 | 0 |

TABLE 1-continued

| $b_0 b_1$ | $b_{1,0}$ | $b_{1,1}$ | DTXI1 | DTXQ1 |
|---|---|---|---|---|
| 10 | 0 | 0 | 0 | 0 |
| 11 | 0 | 1 | 0 | 1 |

In the embodiment, the second logic unit 130 outputs a real value of 0 as the third input bit b2,0 regardless of the value of the parallel bits b0 and b1, and performs an AND operation on the first parallel bit b0 and the inverse of the second parallel bit b1 to generate the fourth input bit b2,1. Also, the second logic unit 130 outputs an asserted second I DTX control signal DTXI2 (e.g., DTXI2 is 0) regardless of the value of the parallel bits b0 and b1. The second logic unit 130 exclusive ORs the first and second parallel bits b0 and b1 to generate the second Q DTX control signal DTXQ2. Table 2 below illustrates the signals generated by the second logic unit 130 for the different possible combinations of the parallel bits b0 and b1.

TABLE 2

| $b_0 b_1$ | $b_{2,0}$ | $b_{2,1}$ | DTXI2 | DTXQ2 |
|---|---|---|---|---|
| 00 | 0 | 0 | 0 | 0 |
| 01 | 0 | 0 | 0 | 1 |
| 10 | 0 | 1 | 0 | 1 |
| 11 | 0 | 0 | 0 | 0 |

As the mentioned above, the first and second modulation mappers 15-1 and 15-2 operate in the same manner as the modulation mapper 15 discussed above with respect to FIG. 4. Accordingly, the modulation mappers 15-1 and 15-2 generate the first and second I and Q signals as indicated below in Table 3.

TABLE 3

| $b_0 b_1$ | $b_{1,0}$ | $b_{1,1}$ | DTXI1 | DTXQ1 | $b_{2,0}$ | $b_{2,1}$ | DTXI2 | DTXQ2 | $I_1$ | $Q_1$ | $I_2$ | $Q_2$ |
|---|---|---|---|---|---|---|---|---|---|---|---|---|
| 00 | 0 | 0 | 0 | 1 | 0 | 0 | 0 | 0 | 0 | +1 | 0 | 0 |
| 01 | 0 | 0 | 0 | 0 | 0 | 0 | 0 | 1 | 0 | 0 | 0 | +1 |
| 10 | 0 | 0 | 0 | 0 | 0 | 1 | 0 | 1 | 0 | 0 | 0 | −1 |
| 11 | 0 | 1 | 0 | 1 | 0 | 0 | 0 | 0 | 0 | −1 | 0 | 0 |

The first and second I and Q signals I1, Q1, I2 and Q2 are supplied to an application specific integrated circuit (ASIC) 200 that includes a number (e.g., eight) of QPSK modulators. More specifically, the first I and Q signals I1 and Q1 are supplied as the I and Q inputs, respectively, to the first spreading unit 80-1 of a first QPSK modulator. In this example embodiment, the first spreading unit 80-1 applies channelization $C_{ch}$ and scrambling S codes in the known manner to generate the first summation signal $(I_1+jQ_1)C_{ch}S$. More specifically, the first spreading unit 80-1 applies a channelization code having a spreading factor of 4, and the channelization code of SF4 is the third code pattern SF4,2 of (1,−1,1,−1) as shown in FIG. 5. Accordingly the first summation signal is $(I_1+jQ_1)C_{ch,4,2}S$. This first summation signal provides the BPSK signal representation for the first parallel bit b0.

A second QPSK modulator in the ASIC 200 receives the second I and Q signals I2 and Q2. More specifically, the second I and Q signals I2 and Q2 are supplied as the I and Q inputs, respectively, to the second spreading unit 80-2 of the second QPSK modulator. In this example embodiment, the second spreading unit 80-2 applies channelization $C_{ch}$ and scrambling S codes to generate the second summation signal $(I_2+jQ_2)C_{ch}S$. More specifically, the second spreading unit 80-2 applies a channelization code having a spreading factor of 4, and the channelization code of SF4 is the fourth code pattern SF4,3 of (1,−1,−1,1) as shown in FIG. 5. Accordingly the second summation signal is $(I_2+jQ_2)C_{ch,4,3}S$. This second summation signal provides the BPSK representation for the second parallel bit b1.

An adder 300, internal or external to the ASIC 200, receives the first and second QPSK signals, and combines these signals to obtain a BPSK signal with a spreading factor of 2; wherein the spreading factor of 2 is the second code pattern 2,1 of (1,−1) shown in FIG. 5. Referring back to Table 3, for each possible combination of the parallel bits b0 and b1, at least three of the first and second I and Q signals have a zero value (i.e., are DTX); and therefore contribute zero chips to the signal output from the adder 300. Namely, the output from adder 300 for a pair of bits is four chips; hence, the spreading factor of 2 is achieved.

The resulting summation signal may then undergo modulation such as by a modulation unit 90 described above with respect to FIG. 4.

As will be appreciated from the above discussion, the embodiment described above with respect to FIG. 6 generates BPSK constellation points lying on the Q-axis. However, other embodiments are possible such as constellation points lying on the I-axis. Table 4 below illustrates the signals generated by the first and second logic units 120 and 130 and the first and second modulation mappers 15-1 and 15-2 for generating BPSK constellation points lying on the I-axis. The logic to produce the output from the first and second logic units 120 and 130 will be readily apparent from Table 4 below.

TABLE 4

| $b_0 b_1$ | $b_{1,0}$ | $b_{1,1}$ | DTXI1 | DTXQ1 | $b_{2,0}$ | $b_{2,1}$ | DTXI2 | DTXQ2 | $I_1$ | $Q_1$ | $I_2$ | $Q_2$ |
|---|---|---|---|---|---|---|---|---|---|---|---|---|
| 00 | 0 | 0 | 1 | 0 | 0 | 0 | 0 | 0 | +1 | 0 | 0 | 0 |
| 01 | 0 | 0 | 0 | 0 | 0 | 0 | 1 | 0 | 0 | 0 | +1 | 0 |
| 10 | 0 | 0 | 0 | 0 | 0 | 1 | 0 | 1 | 0 | 0 | −1 | 0 |
| 11 | 1 | 0 | 1 | 0 | 0 | 0 | 0 | 0 | −1 | 0 | 0 | 0 |

Figure 7:
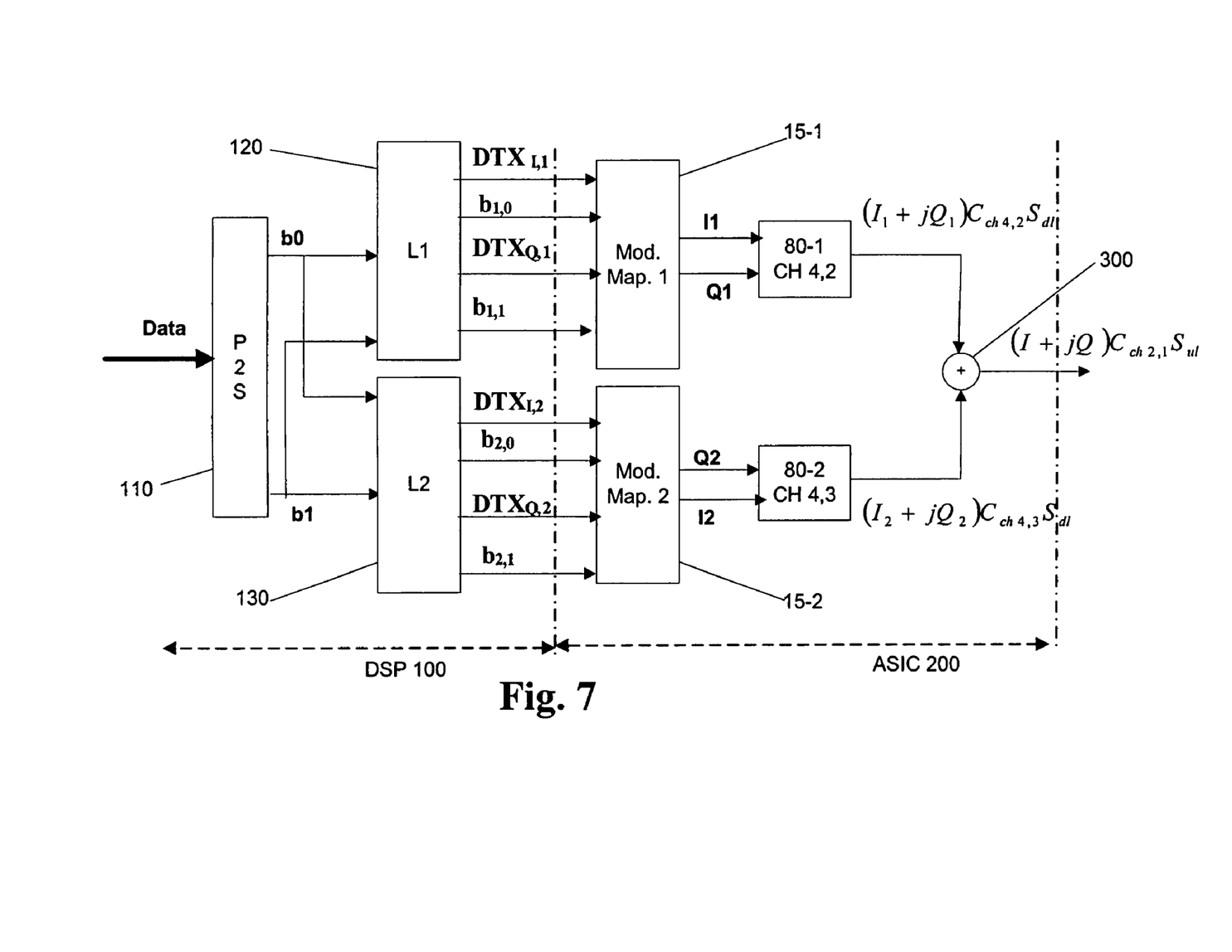
FIG. 7 illustrates a portion of an architecture for spreading data for transmission according to another embodiment of the present invention.

Furthermore, while illustrated and described as being embodied by the DSP 100, the first and second modulation mappers 15-1 and 15-2 may, instead, be embodied in the respective first and second QPSK modulators on the ASIC 200 as shown in FIG. 7.

While not shown in FIG. 6, it will be appreciated that the DSP 100 may receive a single DTX signal to DTX the BPSK output. A single DTX signal may be used because the BPSK constellation points lie on a single axis. In response to the asserted DTX signal, the DSP 100 generates zero values for the first and second I and Q signals.

The present invention provides a BPSK SF2,1 modulator that may leverage existing QPSK circuitry. For example, application specific integrated circuits (ASICs) providing a number (e.g., eight) QPSK modulators on each chip are available and in use in the telecommunication industry. According to aspects of the present invention, this existing technology may be used to generate a BPSK SF2,1 signal without the need for costly development of ASICs having BPSK modulators with a particular spreading factor and code pattern of the spreading factor.

While the embodiment described above gave the example of using QPSK modulators to generate a BPSK modulator output, it will be understood that the higher order modulation scheme used is not limited to QPSK and the lower order modulation scheme produced is not limited to BPSK. Furthermore, while the embodiment described above gave SF4 as an example of a higher order spreading factor and SF2 as an example of a produced lower order spreading factor, it will be understood that the present invention is not limited to SF4 as the higher order spreading factor and SF2 as the lower order spreading factor. Still further, the present invention is not limited to producing an SF2,1 code. Instead an SF2,0 code may be produced; albeit from a different combination of SF4 codes. Accordingly, it will be understood, that the present invention is not limited to producing a particular code pattern.

The invention being thus described, it will be obvious that the same may be varied in many ways. For example, instead of using a DSP, the serial-to-parallel converter and or logic units may be embodied as hardwired circuits, firmware, etc. Additionally, instead of being embodied on the same ASIC, the QPSK modulators may be disposed on separate ASICs or implemented in a DSP, etc.

Furthermore, while the example of developing a lower order modulator using two higher order modulators was provided, it will be readily apparent from the forgoing disclosure that other lower order modulators may be developed using a number (e.g., 2 or more) QPSK or other higher order modulators. This also holds true with respect to producing a lower order spreading factor and/or code pattern. Such variations are not to be regarded as a departure from the invention, and all such modifications are intended to be included within the scope of the invention.

We claim:

1. A bi-phased shift keying (BPSK) modulator, comprising:
    a first mapper configured to generate a first set of inputs based on a first and a second input bit;
    a second mapper configured to generate a second set of inputs based on a third and a fourth input bit;
    a first QPSK modulator generating a first QPSK signal based on the first set of inputs;
    a second QPSK modulator generating a second QPSK signal based on the second set of inputs; and
    a combiner combining the first and second QPSK signals to generate a BPSK signal.

2. The BPSK modulator of claim 1, wherein
    the first QPSK modulator performs a first spreading operation according to a first spreading factor;
    the second QPSK modulator performs a second spreading operation according to the first spreading factor; and
    the first mapper generates the first set of inputs and the second mapper generates the second set of inputs such that the BPSK signal has a second spreading factor, which is less than the first spreading factor.

3. The BPSK modulator of claim 2, wherein the first spreading factor is 4 and the second spreading factor is 2.

4. The BPSK modulator of claim 3, wherein
    the first QPSK modulator performs the first spreading operation using a first spreading pattern of 1,−1,1,−1;
    the second QPSK modulator performs the second spreading operation using a second spreading pattern of 1,−1, −1,1; and
    the BPSK signal has a spreading pattern of 1,−1.

5. The BPSK modulator of claim 1, wherein the first set of inputs are first I and Q signals; and the second set of inputs are second I and Q signals.

6. The BPSK modulator of claim 5, wherein
    the first mapper maps the first input bit and the second input bit into the first I and Q signals based on a first control signal and a second control signal;
    the second mapper maps the third input bit and the fourth input bit into the second I and Q signals based on a third control signal and a fourth control signal;
    the first mapper includes a first logic unit generating the first input bit, the second input bit, the first control signal and the second control signal based on received first and second bits; and
    the second mapper includes a second logic unit generating the third input bit, the fourth input bit, the third control signal and the fourth control signal based on the received first and second bits.

7. The BPSK modulator of claim 6, wherein
    the first and second control signals are a first I DTX control signal and a first Q DTX control signal, respectively; and
    the third and fourth control signals are a second I DTX control signal and a second Q DTX control signal, respectively.

8. The BPSK modulator of claim 7, wherein
    the first logic unit generates a zero as the first input bit, an AND of the received first and second bits as the second input bit, a zero as the first I DTX signal, and an inverse of an exclusive OR of the received first and second bits as the first Q DTX signal; and
    the second logic unit generates a zero as the third input bit; an AND of the received first bit and an inverse of the received second bit as the fourth input bit, a zero as the second I DTX signal, and an exclusive OR of the received first and second bits as the second Q DTX signal.

9. The BPSK modulator of claim 8, wherein
    the first QPSK modulator performs a first spreading operation on the first I and Q signals using a first spreading pattern 1,−1,1,−1; and
    the second QPSK modulator performs a second spreading operation on the second I and Q signals using a second spreading pattern of 1,−1,−1,1.

10. The BPSK modulator of claim 1, wherein
    the first and second input bits are a first I DTX control signal and a first Q DTX control signal, respectively; and
    the third and fourth input bits are a second I DTX control signal and a second Q DTX control signal, respectively.

11. The BPSK modulator of claim 10, wherein
    the first mapper includes a first logic unit generating a zero as the first input bit, an AND of the received first and second bits as the second input bit, a zero as the first I DTX signal, and an inverse of an exclusive OR of the received first and second bits as the first Q DTX signal; and the second mapper includes a second logic unit generating a zero as the third input bit; an AND of the received first bit and an inverse of the received second bit as the fourth input bit, a zero as the second I DTX signal, and an exclusive OR of the received first and second bits as the second Q DTX signal.

12. The BPSK modulator of claim 11, wherein the first QPSK modulator performs a first spreading operation on the first I and Q signals using a first spreading pattern of 1,−1,1,−1; and the second QPSK modulator performs a second spreading operation on the second I and Q signals using a second spreading pattern of 1,−1,−1,1.

* * * * *

UNITED STATES PATENT AND TRADEMARK OFFICE
CERTIFICATE OF CORRECTION

PATENT NO.       : 7,646,801 B2
APPLICATION NO.  : 11/339570
DATED            : January 12, 2010
INVENTOR(S)      : Farag et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 948 days.

Signed and Sealed this

Twenty-eighth Day of December, 2010

David J. Kappos
*Director of the United States Patent and Trademark Office*